(12) United States Patent
Lacy et al.

(10) Patent No.: US 9,174,727 B2
(45) Date of Patent: Nov. 3, 2015

(54) LANDING GEAR STEERING USING ECCENTRIC BEARINGS

(75) Inventors: Stuart Lacy, Cheltenham (GB); Yann Simonneaux, Cheltenham (GB)

(73) Assignee: Messier-Dowty Limited (GB)

( * ) Notice: Subject to any disclaimer, the term of this patent is extended or adjusted under 35 U.S.C. 154(b) by 174 days.

(21) Appl. No.: 13/978,790

(22) PCT Filed: Dec. 21, 2011

(86) PCT No.: PCT/GB2011/052538
§ 371 (c)(1),
(2), (4) Date: Nov. 7, 2013

(87) PCT Pub. No.: WO2012/095621
PCT Pub. Date: Jul. 19, 2012

(65) Prior Publication Data
US 2014/0048645 A1   Feb. 20, 2014

(30) Foreign Application Priority Data

Jan. 11, 2011 (GB) .................................. 1100429.8

(51) Int. Cl.
*B64C 25/36* (2006.01)
*B64C 25/50* (2006.01)
*B64C 25/34* (2006.01)

(52) U.S. Cl.
CPC .................. *B64C 25/50* (2013.01); *B64C 25/34* (2013.01); *B64C 25/36* (2013.01); *B64C 2025/345* (2013.01)

(58) Field of Classification Search
CPC ................................. B64C 25/34; B64C 25/36

USPC .............. 384/7, 129, 154–156, 261–263, 255
See application file for complete search history.

(56) References Cited

U.S. PATENT DOCUMENTS

| 3,643,898 A | 2/1972 | Witener et al. |
| 4,087,103 A | 5/1978 | Smith |
| 4,380,323 A | 4/1983 | Masclet et al. |
| 5,242,131 A | 9/1993 | Watts |

(Continued)

FOREIGN PATENT DOCUMENTS

| CN | 101208241 | 6/2008 |
| DE | 197 05 888 | 8/1998 |

(Continued)

OTHER PUBLICATIONS

Kaysan, Rainer, Authorized Officer of EPO, International Search Report of PCT/GB2011/052538, Apr. 18, 2012.

(Continued)

*Primary Examiner* — Tien Dinh
*Assistant Examiner* — Michael A Fabula
(74) *Attorney, Agent, or Firm* — RatnerPrestia (57) ABSTRACT

A landing gear assembly for an aircraft, the landing gear assembly including: an elongate bogie beam; a first axle bearing having an outer part rotatably coupled to an inner part, the outer part being coupled to the bogie beam, the inner part including a mounting aperture; and an elongate axle provided through the mounting aperture of the inner part and coupled thereto, wherein the axle is coupled to the inner part of the first axle bearing in a configuration such that the longitudinal axis of the axle is spaced from the axis of rotation of the inner part, such that rotation of the inner part causes a change in the orientation of the axle relative to the bogie beam.

20 Claims, 5 Drawing Sheets

(56) References Cited

U.S. PATENT DOCUMENTS

| | | | |
|---|---|---|---|
| 5,595,359 A | 1/1997 | Meneghetti | |
| 6,029,931 A | 2/2000 | Encarthe et al. | |
| 8,136,754 B2 | 3/2012 | DeRuffray et al. | |
| 2003/0111576 A1 | 6/2003 | Reniau | |

FOREIGN PATENT DOCUMENTS

| | | |
|---|---|---|
| EP | 0870665 | 10/1998 |
| FR | 898 049 | 4/1945 |
| GB | 689048 | 3/1953 |
| JP | 56 052622 | 5/1981 |
| JP | 2005104279 | 4/2005 |

OTHER PUBLICATIONS

First Office Action, with English translation, for CN201180064642.2 dated Jan. 19, 2015.

Combined Search and Examination Report for International Application No. GB1100429.8 dated Mar. 31, 2011.

LANDING GEAR STEERING USING ECCENTRIC BEARINGS

This application is a U.S. National Phase application of PCT International Application No. PCT/GB2011/052538, filed Dec. 21, 2011, which claims the benefit of GB 1100429.8, filed Jan. 11, 2011.

FIELD

This invention relates to a landing gear assembly for an aircraft and a method of steering a landing gear assembly.

BACKGROUND

Large aircraft are often provided with multi-axle landing gear. In some cases, one of the axles is steerable so as to reduce tyre wear and improve manoeuvrability when the aircraft is taxiing. Such a steerable axle is generally pivotally connected to the landing gear bogie beam by a vertical shaft. An actuator is provided between the bogie beam and axle to control the orientation of the axles.

The present inventor has identified that it would be desirable to provide an alternative way of steering an axle of an aircraft landing gear.

SUMMARY

In accordance with a first aspect of the present invention, there is provided landing gear assembly for an aircraft. The landing gear assembly may include an elongate bogie beam. The landing gear assembly may include a first axle bearing having an outer part rotatably coupled to an inner part. The outer part may be coupled to the bogie beam. The inner part may include a mounting aperture. The landing gear assembly may include an elongate axle provided through the mounting aperture of the inner part. The elongate axle may be coupled to the inner part. The axle may be coupled to the inner part of the first axle bearing in a configuration such that the longitudinal axis of the axle is spaced from the axis of rotation of the inner part, such that rotation of the inner part causes a change in the orientation of the axle relative to the bogie beam.

The first axle bearing may include an intermediate part provided between the inner and outer parts and rotatably coupled thereto. The first axle bearing may be arranged such that the axis of rotation of the inner part is spaced from the axis of rotation of the intermediate part, such that rotation of the intermediate part causes a change in the orientation of the axle relative to the bogie beam.

The landing gear assembly may include a second axle bearing having an outer part rotatably coupled to an inner part, the outer part being coupled to an opposite side of the bogie beam to the first axle bearing. The inner part may include a mounting aperture. The elongate axle may be provided through the mounting aperture of the inner part of the axle bearing and coupled thereto. The axle may be coupled to the inner part of the second axle bearing in a configuration such that the longitudinal axis of the axle is spaced from the axis of rotation of the inner part, such that rotation of the inner part causes a change in the orientation of the axle relative to the bogie beam.

The second axle bearing may include an intermediate part provided between the inner and outer parts. The intermediate part may be rotatably coupled to the inner and outer parts. The second axle bearing may be arranged such that the axis of rotation of the inner part is spaced from the axis of rotation of the intermediate part, such that rotation of the intermediate part causes a change in the orientation of the axle relative to the bogie beam.

The mounting aperture of the inner part of the first and/or second axle bearing may be of substantially circular cross section. The mounting aperture of the inner part of the first and/or second axle bearing may be coaxial with the longitudinal axis of the axle.

The landing gear assembly may include an actuator arranged to cause rotation of the inner part of the first axle bearing. The landing gear assembly may include an actuator arranged to cause rotation of the intermediate part of the first axle bearing. The landing gear assembly may include an actuator arranged to cause rotation of the inner part of the second axle bearing. The landing gear assembly may include an actuator arranged to cause rotation of the intermediate part of the second axle bearing.

The landing gear assembly may be provided in combination with a control system for controlling the actuator or actuators. The control system may be arranged to do one or more of the following:

cause the inner part of the first axle bearing to rotate relative to the bogie beam;

cause the inner parts of the first and second axle bearings to simultaneously rotate in opposite directions at the same angular velocity;

cause the inner part of one of the first and second axle bearings to rotate simultaneously with the intermediate part of the same one of the first and second axle bearings so as to steer the axle in a generally horizontal plane;

cause the inner part of one of the first and second axle bearings to rotate simultaneously with the intermediate part of the same one of the first and second axle bearings so as to steer the axle in a generally vertical plane; and cause the inner part of one of the first and second axle bearings to rotate simultaneously with the intermediate part of the same one of the first and second axle bearings so as to cause the axle to move in a non linear path.

According to a second aspect of the present invention, there is provided a method of steering a landing gear assembly according to any preceding claim, including the steps of:

generating a control signal for controlling the angular position of the inner part of the first axle bearing;

transmitting the control signal to an actuator controlling the angular position of the inner part of the first axle bearing so as to cause the inner part of the first axle bearing to rotate to an angular position.

The method may include the step of:

generating a second control signal for controlling the angular position of the intermediate part of the first axle bearing.

The method may include the step of:

transmitting the second control signal to an actuator controlling the angular position of the intermediate part of the first axle bearing so as to cause the intermediate part of the first axle bearing to rotate to an angular position concurrently with the rotation of the inner part of the first axle bearing.

The method may include the step of:

generating a third control signal for controlling the angular position of the inner part of the second axle bearing.

The method may include the step of:

transmitting the third control signal to an actuator controlling the angular position of the inner part of the second axle bearing so as to cause the inner part of the second axle bearing to rotate to an angular position concurrently with, in an opposite direction to and at the same angular velocity to the rotation of the inner part of the first axle bearing.

At least some embodiments of the present invention provide one or more of the following advantages:

A different way of steering an axle in comparison with known methods.

An axle that is steerable yet also well supported by the bogie beam.

An axle that does not tilt during steering.

An axle that tilts in a specific manner, under steering, so as to lift one or more wheel assemblies away from the ground so as to reduce torsion within the bogie beam.

BRIEF DESCRIPTION OF THE DRAWINGS

By way of example only, certain embodiments of the invention will now be described by reference to the accompanying drawings, in which.

DETAILED DESCRIPTION

Figure 1:
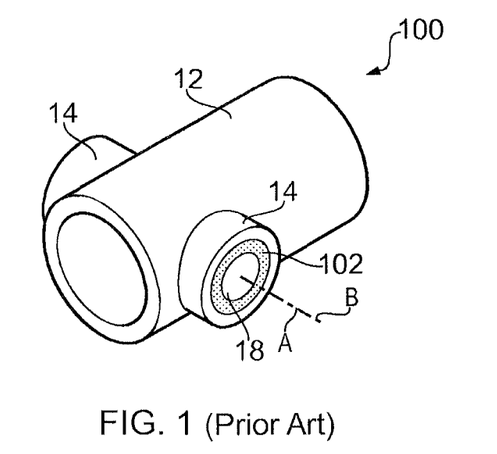
FIG. 1 is a schematic, partial view of a prior art landing gear assembly.

FIG. 1 shows a prior art landing gear assembly 100. The landing gear assembly 100 includes an elongate bogie beam 12 arranged to be coupled to an aircraft via a shock strut (not shown). The bogie beam 12 is hollow and includes tubular shoulder portions 14 that project laterally from opposite the sides of the bogie beam. The tubular shoulder portions 14 are hollow so as to define a pair of bogie sockets 14. The bogie sockets 14 are each provided with a generally cylindrical bushing 102 that includes a mounting aperture 18 of generally circular cross section for receiving an elongate, generally cylindrical axle (not shown) in a conventional coupling manner, such as by heating the bushing 102 prior to it receiving the axle and thereafter letting the bushing 102 cool and contract to provide an interference fit with the axle. The axle has a longitudinal axis A that extends along the centre of the axle. The bushing 102 has a bushing axis B that extends along the centre of the bushing 102. The position of the mounting aperture 18 within the bushing 102 is such that the axle axis A is coaxial with the bushing axis B.

Figure 2:
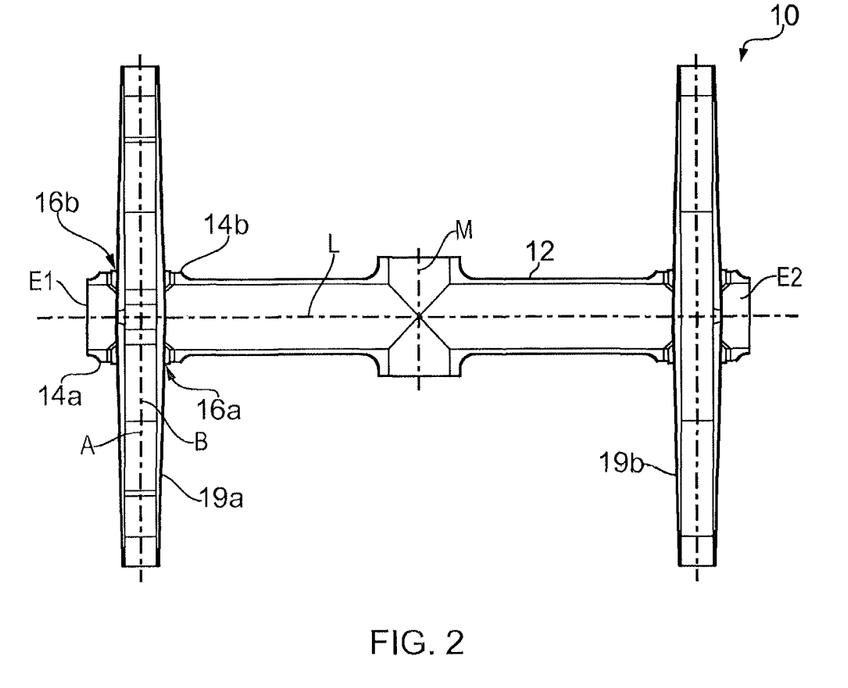
FIG. 2 is a schematic view from above, in cross-section, of a landing gear assembly according to a first embodiment of the present invention.

FIG. 2 shows a schematic cross-sectional view of a landing gear assembly 10 according to a first embodiment of the present invention. The landing gear assembly 10 includes a conventional elongate bogie beam 2 having a first end E1, a second end E2, a longitudinal axis L and a lateral axis M about which the bogie beam 2 may pivot in use. The bogie beam 2 includes a first pair of sockets 14a, 14b that each contain an axle bearing 16a, 16b. The first axle bearing 16a is provided in a first of the bogie sockets 14a on a first side of a plane intersecting the longitudinal axis L of the bogie beam 12. The second axle bearing 16b is provided in a second socket 14b on a second side of the plane intersecting the longitudinal axis L of the bogie beam 12. The axle bearing 16a, 16b are described in more detail below.

The landing gear assembly 10 includes a steerable axle 19a that is supported by the axle bearings 16a, 16b. The steerable axle 19a is arranged to carry one or more wheel assemblies (not shown).

The landing gear assembly 10 also includes a second steerable axle 19b which is configured in a similar manner to the axle 19a and as such, for brevity, will not be described in any detail. It should be noted however that in some embodiments that landing gear assembly 10 may include, in addition to the steerable axle 19a, one or more conventional fixed axles and/or steerable axles.

Figure 3:
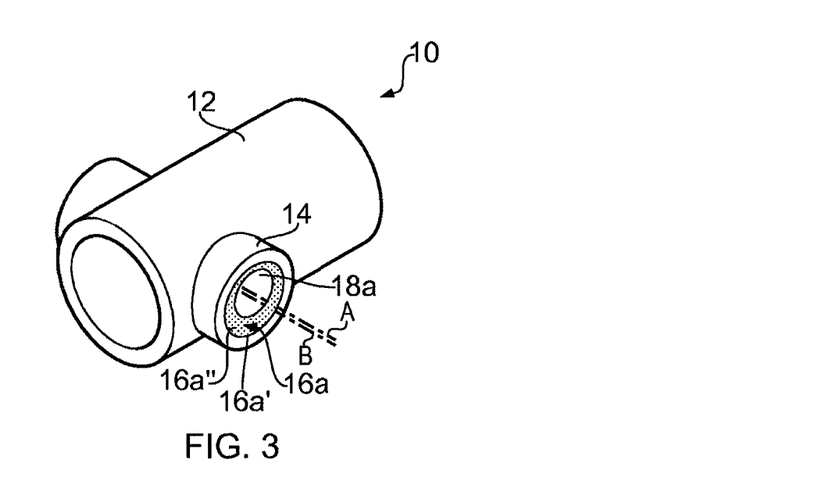
FIG. 3 is a schematic, partial, view of the landing gear assembly of FIG. 2.

Referring additionally to FIG. 3, the first axle bearing 16a is shown in more detail. The first axle bearing 16a includes an outer part 16a' that is coupled to the inside face of the bogie socket 14a by conventional means, such as by way of an interference fit. An inner part 16a" is rotatably coupled to the outer part 16a' so as to rotate about an inner part bearing axis B. A conventional rotary actuator (not shown) is provided for rotationally driving the inner part 16a" in response to a control signal. The inner part 16a" includes a mounting aperture 18a of generally circular cross section that extends through the inner part 16a" and has an aperture axis (not shown) that is generally parallel to the lateral axis M of the bogie beam 12.

The axle 19a is disposed within the mounting aperture 18a and coupled to the inner part 16a" by conventional means, such as by way of an interference fit. The longitudinal axis A of the axle 19a is offset with respect to the inner part bearing axis B. The term "offset" is used to mean that two axes are not coaxial, but rather are spaced from one another.

Rotation of the inner part 16a" causes a portion of the axle 19a in the region of the axle bearing 16a to move in an arc. As noted above, the axle 19a is restrained by a pair of axle bearing 16a, 16b and consequently the inner part 16a" can be rotated to both steer (rotate the axle 19a in a generally horizontal plane) and tilt (rotate the axle 19a in a generally vertical plane) the axle 19a, as described in more detail below.

In the illustrated embodiment the axle 19a fills the mounting aperture 18a such that the axle axis A is coaxial with the axis of the mounting aperture 18a. Consequently, the axle axis A is spaced from the inner part bearing axis B due to the location at which the mounting aperture 18a extends through the inner part 16a" and rotation of the inner part causes the centre of the mounting aperture 18a to move in an arc having the inner part bearing axis B as its centre. However, in other embodiments the axle axis A may be spaced from the axis of the mounting aperture 18a due to, for example, a spacer being provided between the axle 19a and the peripheral inner wall of the inner part 16a" that defines the mounting aperture 18a.

The inner part 16a" is arranged to permit the axle 19a to pivot about it whilst remaining coupled to it. In some embodiments the inner circumferential face that defines the mounting aperture 18a has a rounded or bevelled profile to accommodate the change in the angular position of the axle 19a relative to the bogie beam 12. For example, the inner circumferential face may be generally annular i.e. has a convex profile such that the mounting aperture 18a is narrower towards its centre than towards its edges. However, in other embodiments the inner circumferential face that defines the mounting aperture 18a may include resilient deformable regions to provide a similar function. For example, it may include a deformable region arranged to remain in contact with the axle 19a throughout its steering and/or tilting.

The second axle bearing 16b has the same configuration as the first axle bearing 16a and as such, for brevity, will not be described in any further detail.

Figure 4A:
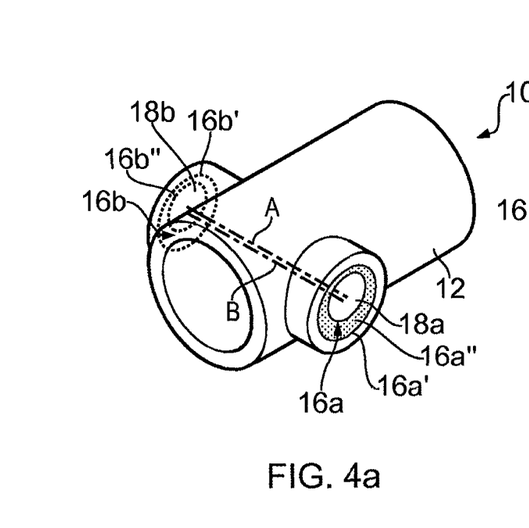
FIGS. 4a is a schematic, partial view of the landing gear assembly of FIG. 2 showing the inner part of the first axle bearing at a first angular position.

Referring to FIG. 4a, with the inner part 16a" of the first axle bearing 16a in a first angular position, in which the mounting aperture 18a is at an uppermost position, and with the inner part 16b" of the second axle bearing 16b in a corresponding angular position, the axle axis A is positioned above, and is parallel with respect to, the inner part bearing axis B. Consequently, the axle (not shown) would be generally orthogonal with respect to, and positioned slightly higher than, the longitudinal axis L of the bogie beam 2.

Figure 4B:
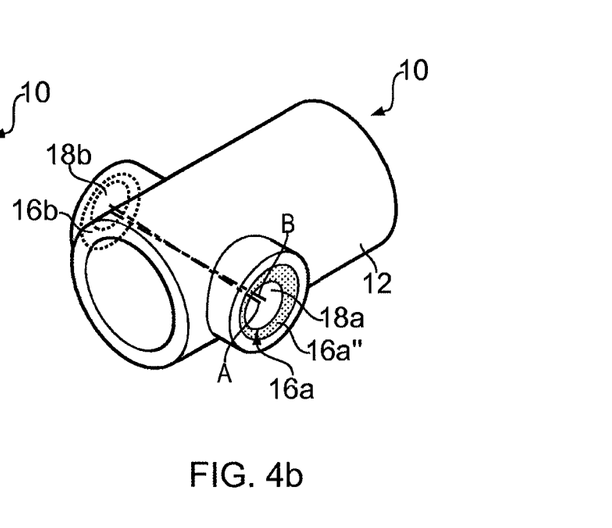
FIGS. 4b is a schematic, partial view of the landing gear assembly of FIG. 2 showing the inner part of the first axle bearing at a second angular position.

Referring now to FIG. 4b, the inner part 16b" of the second axle bearing 16b has remained in the same position as shown in FIG. 4a. However, the inner part 16a" of the first axle bearing 16a has rotated anti-clockwise by a quarter of a complete revolution such that the mounting aperture 18a is now at a left-most position. This rotation of the inner part 16a" causes a local region of the axle 19a to move in an arc, which results in the axle axis A no longer being parallel with respect to the inner part bearing axis B. More specifically, the anti-clockwise rotation of the inner part 16a" has caused a portion of the axle 19a on the side of the first axle bearing 16a to move towards the first end E1 of the bogie beam 12 and a portion of the axle 19a on the side of the second axle bearing 16b to move towards the second end E2 of the bogie beam 12, resulting in steering of the axle 19a. The portion of the axle 19a on the side of the first axle bearing 16a has also moved downwards, resulting in tilting of the axle 19a.

Figure 5:
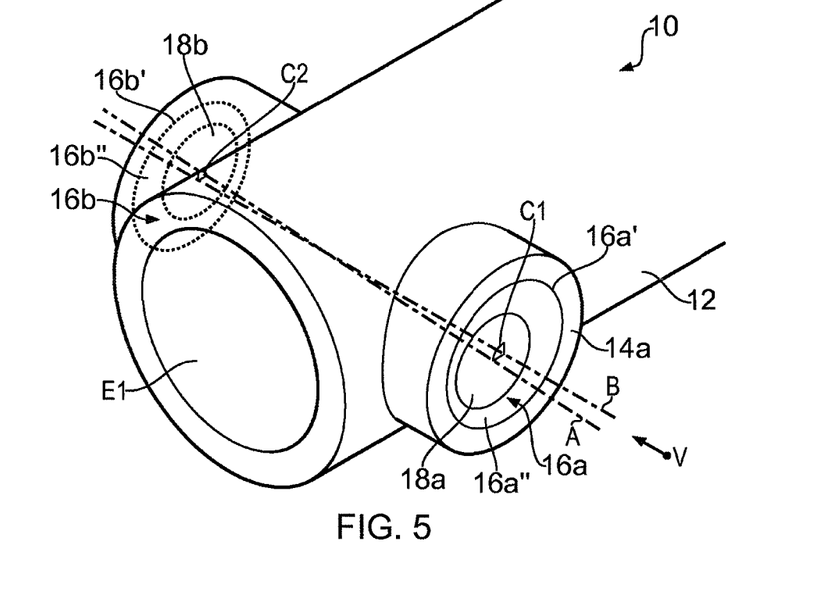
FIG. 5 shows a schematic, partial view of the landing gear assembly of FIG. 2 in a configuration where the inner parts of the first and second axle bearing have moved in opposite directions to one another by an equal amount so as to steer the axle.

Referring to FIG. 5, the steering displacement of the axle 19a can be increased by rotating both the inner part 16a" of the first axle bearing 16a and the inner part 16b" of the second axle bearing 16b in opposite directions ("opposite directions" is used to mean opposite directions when each axle bearing 16a, 16b is viewed from the same side of the bogie beam 12). When viewed from the position V, the inner part 16a" of the first axle bearing 16a has rotated anticlockwise about the inner part bearing axis B by one quarter of a revolution resulting in the local portion of the axis A moving through arc C1. The inner part 16b" of the second axle bearing 16b has rotated clockwise about the inner part bearing axis B by one quarter of a revolution resulting in the local portion of the axis A moving through arc C2. This would result in the landing gear assembly 10 steering to the right hand side if the direction of travel is towards the first end E1 of the bogie beam 12. It should be noted that operating the axle bearings 16a, 16b in this manner also cancels out tiling of the axle 16a because the vertical component of the arc C1, C2 is the same for each axle bearing 16a, 16b. The axle 19a as a whole does however raise or lower when moving from its central, orthogonal, position to a left or right steering position.

Figures 6A, 6B:
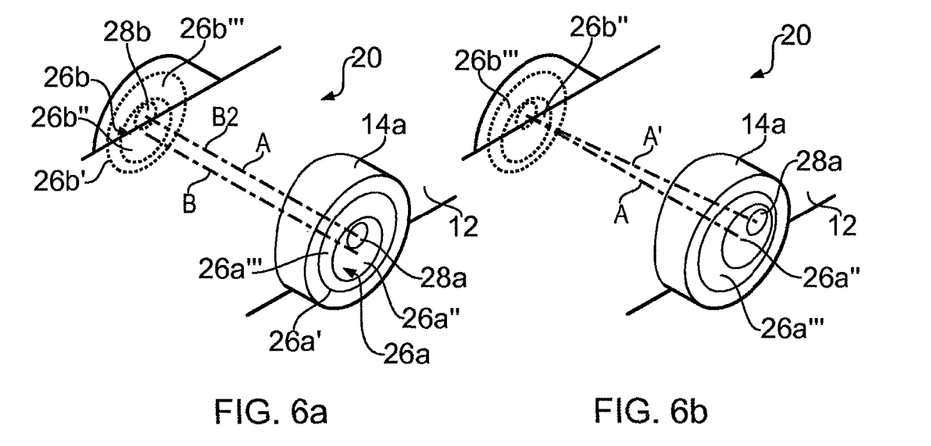
FIGS. 6a and 6b are schematic, partial views of a landing gear assembly according to a second embodiment of the present invention including an axle bearing having movable inner and intermediate parts for steering an axle.

Referring to FIG. 6a, a schematic partial view of a landing gear assembly 20 according to a second embodiment of the present invention is shown. The landing gear assembly 20 according to illustrated embodiment is generally the same as the landing gear assembly 10 according to the first embodiment, but includes nested wheel bearings to enable axle tilt and axle height to be controller in an improved manner relative to the landing gear assembly 10 according to the first embodiment.

The first axle bearing 26a includes an outer part 26a' coupled to the bogie socket 14a in a conventional manner, an inner part 26a" rotatably mounted with respect to the outer part 26a' and an intermediate part 26a''' rotatably coupled to both the outer part 26a' and the inner part 26a". The inner part 26a" is nested within the intermediate part 26a''' , which in turn is nested within the outer part 26a'. The intermediate part 26a''' is rotatable about an intermediate part bearing axis B2. A conventional rotary actuator (not shown) is provided for rotationally driving the intermediate part 26a''' in response to a control signal. The inner part 26a" is rotatable about an inner part bearing axis B and, as with the first embodiment, includes a mounting aperture 28a arranged to receive and couple with an axle (not shown). A conventional rotary actuator (not shown) is provided for rotationally driving the inner part 26a" in response to a control signal. The first axle bearing 26a is arranged such that the intermediate part bearing axis B2 is offset relative to the inner part bearing axis B and the longitudinal axis A of the axle is offset relative to the inner part bearing axis B. Consequently, the steering and tilt angle of the axle can be varied by rotating either of the inner part 26a" or intermediate part 26a''' to cause the local portion of the axle to move in an arc. However, simultaneous rotation of both the inner part 26a" and intermediate part 26a''' together can result in linear or near linear steering and/or tilting movement of the axle.

The second axle bearing 26b has the same configuration as the first axle bearing 26a and as such, for brevity, will not be described in any further detail.

As shown in FIG. 6a, the inner parts 26a", 26b" are angularly positioned such that the respective mounting apertures 28a, 28b are at an uppermost position. The intermediate parts 26a''', 26b''' are angularly positioned such that the respective inner parts 26a", 26b" are at a lowermost position.

Referring to FIG. 6b, the inner part 26b" and intermediate part 26b''' of the second axle bearing 26b are in the same angular positions as shown in FIG. 6a. However the inner part 26a" of the first axle bearing 26a has rotated clockwise by approximately one fifth of a complete revolution and the intermediate part 26a''' has rotated anticlockwise by approximately one quarter of a complete revolution, resulting in the axle axis A being linearly steered in a generally horizontal plane to assume the steering angle shown by axle axis A'. Thus, by providing the nested inner and intermediate parts, the axle 19a can be moved in a non-actuate manner, thereby eliminating tilt. Given this teaching, it will be appreciated that the inner parts 26a", 26b" and intermediate parts 26a''', 26b''' can be controlled in various ways to cause, for example, steering of the axle along with a specific amount of tilt which may in some cases reduce drag or alter the vertical forces during taxiing and thus reduce torsion within the bogie beam. Many suitable configurations will now be apparent to the skilled person.

Figure 7:
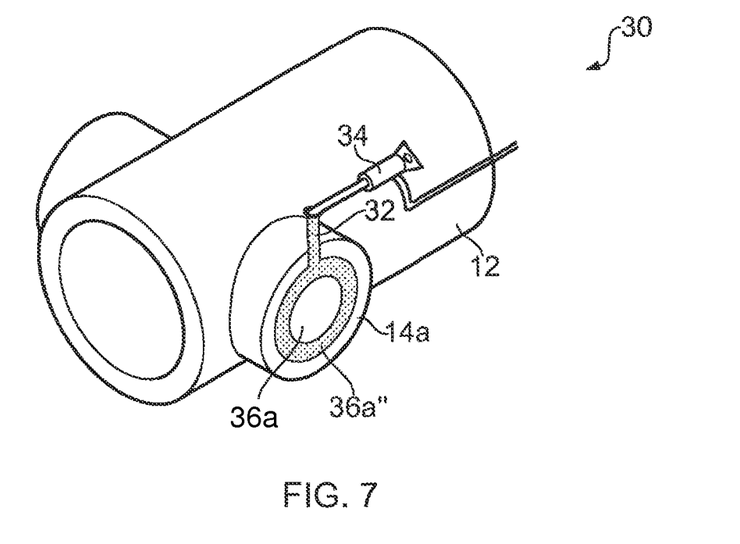
FIG. 7 is a partial, schematic view of a landing gear assembly according to a third embodiment of the present invention including a linear actuator for controlling the angular position of the inner part of a first axle bearing.

FIG. 7 shows a schematic partial view of a landing gear assembly 30 according to a third embodiment of the present invention. The landing gear assembly 30 according to this embodiment is similar to the landing gear assembly 10 according to a first embodiment. However, rather than the inner part 16*a*" of the first axle bearing 16*a* being driven by a rotary actuator, for example a stepper motor, the inner part 36*a*" of the first axle bearing 36*a* of the this embodiment is actuated by a hydraulic actuator 34. The cylinder of the hydraulic actuator 34 is pivotally mounted on the bogie beam 5 and the actuator rod coupled to a lever arm 32 protruding from the inner part 36*a*". Extension and retraction of the hydraulic actuator 34 therefore generates a torque that rotates the inner part 36*a*"'.

Figure 8:
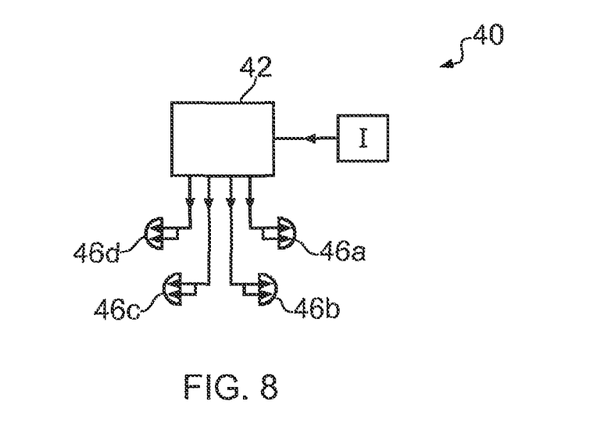
FIG. 8 is a schematic diagram of a control system for controlling the angular position of the moving parts of axle bearings of the landing gear assembly according to the second embodiment of the present invention.

FIG. 8 shows a schematic view of a control system 40 suitable for controlling the angular position of the moving parts of axle bearings 26*a*, 26*b* of the landing gear assembly 20 according to the second embodiment of the present invention. The control system 40 is conventional in the art and, for brevity, will not be described in any detail. The control system 40 includes a processing device 42, such as a micro controller, running a control program. The processing device 42 receives control input signals from an input device I, such as a joystick provided in the cockpit of an aircraft, and converts the control input signals to control output signals that are transmitted to four rotary actuators 46*a* to 46*d* each arranged to control the angular position of the one of the inner and intermediate parts of the first and second axle bearings 26*a*, 26*b*. A landing gear assembly according to embodiments of the present invention may be controlled by any suitable control system.

Figure 9:
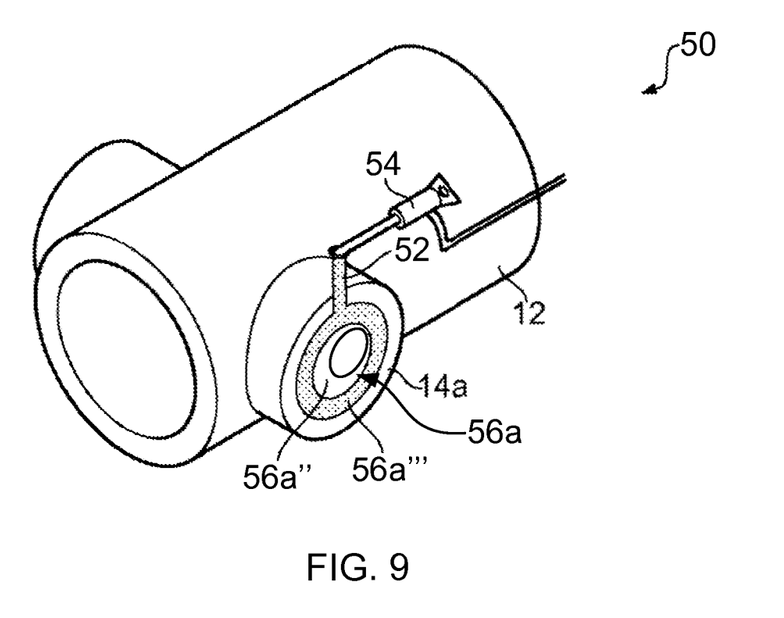
FIG. 9 is a partial, schematic view of a landing gear assembly including a linear actuator for controlling the angular position of the intermediate part of a first axle bearing.

FIG. 9 shows a schematic partial view of a landing gear assembly 50 according to a further embodiment. The landing gear assembly 50 according to this embodiment is similar to the landing gear assembly 30 according to the third embodiment. However, rather than the inner part 56*a*" of the first axle bearing 56*a* being actuated by a hydraulic actuator 54, an intermediate part 56*a*'" of the first axle bearing 56*a* is actuated by a hydraulic actuator 54 via a lever arm 52 protruding from the intermediate part 56*a*'". Extension and retraction of the hydraulic actuator 54 therefore generates a torque that rotates the inner part 56*a*'".

Any of the rotating parts of the described axle bearings can be actuated by suitable means, such as hydraulic or electrical linear or rotary actuators.

The landing gear assembly according to embodiments of the invention may be a main landing gear assembly.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "including" does not exclude the presence of elements or steps other than those listed in any claim or the specification as a whole. The singular reference of an element does not exclude the plural reference of such elements and vice-versa. Parts of the invention may be implemented by means of hardware comprising several distinct elements, and/or by means of a suitably programmed computer. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. A landing gear assembly for an aircraft, the landing gear assembly including:
   an elongate bogie beam;
   a first axle bearing having an outer part rotatably coupled to an inner part, the outer part of the first axle bearing being coupled to the bogie beam, the inner part of the first axle bearing including a mounting aperture; and
   an elongate wheel axle provided through the mounting aperture of the inner part of the first axle bearing and coupled thereto,
   wherein the axle is coupled to the inner part of the first axle bearing in a configuration such that a longitudinal axis of the axle is parallel with respect to an axis of rotation of the inner part of the first axle bearing when the inner part of the first axle bearing is at a first angular position relative to the outer part of the first axle bearing, and the longitudinal axis of the axle is spaced from the axis of rotation of the inner part, such that rotation of the inner part causes a change in the orientation of the axle relative to the bogie beam.

2. The landing gear assembly according to claim 1, wherein the first axle bearing includes an intermediate part provided between the inner and outer parts and rotatably coupled to each and wherein the first axle bearing is arranged such that the axis of rotation of the inner part is spaced from an axis of rotation of the intermediate part, such that rotation of the intermediate part causes a change in the orientation of the axle relative to the bogie beam.

3. The landing gear assembly according to claim 1 including a second axle bearing having an outer part rotatably coupled to an inner part, the outer part being coupled to an opposite side of the bogie beam to the first axle bearing, the inner part including a mounting aperture, wherein the elongate wheel axle is provided through the mounting aperture of the inner part of the second axle bearing and coupled thereto, and wherein the axle is coupled to the inner part of the second axle bearing in a configuration such that the longitudinal axis of the axle is spaced from an axis of rotation of the inner part of the second axle bearing, such that rotation of the inner part causes a change in the orientation of the axle relative to the bogie beam.

4. The landing gear assembly according to claim 3, wherein the second axle bearing includes an intermediate part provided between the inner and outer parts and rotatably coupled to each, and wherein the second axle bearing is arranged such that the axis of rotation of the inner part of the second axle bearing is spaced from an axis of rotation of the intermediate part of the second axle bearing, such that rotation of the intermediate part causes a change in the orientation of the axle relative to the bogie beam.

5. The landing gear assembly according to claim 1, wherein the mounting aperture of the inner part of the first axle bearing is of substantially circular cross section and coaxial with the longitudinal axis of the axle.

6. The landing gear assembly according to claim 1 including an actuator arranged to cause rotation of the inner part of the first axle bearing.

7. The landing gear assembly according to claim 6 in combination with a control system for controlling the actuator, the control system being programmed to:
   cause the inner part of the first axle bearing to rotate relative to the bogie beam.

8. A method of steering a landing gear assembly according to claim 7, the method including the steps of:
   generating a control signal for controlling the angular position of the inner part of the first axle bearing;
   transmitting the control signal to the actuator controlling the angular position of the inner part of the first axle bearing so as to cause the inner part of the first axle bearing to rotate to an angular position.

9. The method according to claim 8, wherein the first axle bearing includes an intermediate part provided between the inner and outer parts and rotatably coupled to each, wherein the first axle bearing is arranged such that the axis of rotation of the inner part is spaced from the axis of rotation of the intermediate part, such that rotation of the intermediate part causes a change in the orientation of the axle relative to the bogie beam, and including an actuator arranged to cause rotation of the intermediate part of the first axle bearing; and the method further includes the steps of:

generating a second control signal for controlling the angular position of the intermediate part of the first axle bearing; and transmitting the second control signal to the actuator controlling the angular position of the intermediate part of the first axle bearing so as to cause the intermediate part of the first axle bearing to rotate to an angular position concurrently with the rotation of the inner part of the first axle bearing.

10. The method according to claim 9, wherein the landing gear assembly includes a second axle bearing having an outer part rotatably coupled to an inner part, the outer part being coupled to an opposite side of the bogie beam to the first axle bearing, the inner part of the second axle bearing including a mounting aperture, wherein the elongate wheel axle is provided through the mounting aperture of the inner part of the second axle bearing and coupled thereto, wherein the axle is coupled to the inner part of the second axle bearing in a configuration such that the longitudinal axis of the axle is spaced from the axis of rotation of the inner part of the second axle bearing, such that rotation of the inner part of the second axle bearing causes a change in the orientation of the axle relative to the bogie beam, and including a second actuator arranged to cause rotation of the intermediate part of the second axle bearing; and wherein the method further includes the steps of:

generating a third control signal for controlling the angular position of the inner part of the second axle bearing; and transmitting the third control signal to the second actuator controlling the angular position of the inner part of the second axle bearing so as to cause the inner part of the second axle bearing to rotate to an angular position concurrently with, in an opposite direction to and at the same angular velocity with respect to the rotation of the inner part of the first axle bearing.

11. The landing gear assembly according to claim 2, including an actuator arranged to cause rotation of the intermediate part of the first axle bearing.

12. The landing gear assembly according to claim 11 in combination with a control system for controlling the actuator, the control system being programmed to do one or more of the following:

cause the inner part of the first axle bearing to rotate relative to the bogie beam;

cause the inner part of the first axle bearing to rotate simultaneously with the intermediate part of the first axle bearing so as to steer the axle in a generally horizontal plane;

cause the inner part of the first axle bearing to rotate simultaneously with the intermediate part of the first axle bearing so as to steer the axle in a generally vertical plane; and cause the inner part of the first axle bearing to rotate simultaneously with the intermediate part of the first axle bearing so as to cause the axle to move in a nonlinear path.

13. The landing gear assembly according to claim 3, including an actuator arranged to cause rotation of the inner part of the second axle bearing.

14. The landing gear assembly according to claim 13 in combination with a control system for controlling the actuators, the control system being programmed to do one or more of the following:

cause the inner parts of the first and second axle bearings to rotate relative to the bogie beam; and cause the inner parts of the first and second axle bearings to simultaneously rotate in opposite directions at the same angular velocity.

15. The landing gear assembly according to claim 4, including an actuator arranged to cause rotation of the inner part of the first axle bearing and an actuator arranged to cause rotation of the intermediate part of the second axle bearing.

16. The landing gear assembly according to claim 15 in combination with a control system for controlling the actuators, the control system being programmed to do one or more of the following:

cause the inner part of the first axle bearing to rotate relative to the bogie beam;

cause the inner parts of the first and second axle bearings to simultaneously rotate in opposite directions at the same angular velocity;

cause the inner part of the second axle bearing to rotate simultaneously with the intermediate part of the second axle bearing so as to steer the axle in a generally horizontal plane;

cause the inner part of the second axle bearing to rotate simultaneously with the intermediate part of the second axle bearing so as to steer the axle in a generally vertical plane; and cause the inner part of the second axle bearing to rotate simultaneously with the intermediate part of the second axle bearing so as to cause the axle to move in a nonlinear path.

17. The landing gear assembly according to claim 4, wherein the first axle bearing includes an intermediate part provided between the inner and outer parts of the first axle bearing and rotatably coupled to each, and wherein the first axle bearing is arranged such that the axis of rotation of the inner part of the first axle bearing is spaced from the axis of rotation of the intermediate part of the first axle bearing, such that rotation of the intermediate part of the first axle bearing causes a change in the orientation of the axle relative to the bogie beam.

18. The landing gear assembly according to claim 17, including an actuator arranged to cause rotation of the intermediate part of the first axle bearing, and an actuator arranged to cause rotation of an intermediate part of the second axle bearing.

19. A landing gear assembly according to claim 18 in combination with a control system for controlling the actuators, the control system being programmed to do one or more of the following:

cause the inner part of the first axle bearing to rotate relative to the bogie beam;

cause the inner parts of the first and second axle bearings to simultaneously rotate in opposite directions at the same angular velocity;

cause the inner part of one of the first and second axle bearings to rotate simultaneously with the intermediate part of the same one of the first and second axle bearings so as to steer the axle in a generally horizontal plane;

cause the inner part of one of the first and second axle bearings to rotate simultaneously with the intermediate part of the same one of the first and second axle bearings so as to steer the axle in a generally vertical plane; and cause the inner part of one of the first and second axle bearings to rotate simultaneously with the intermediate part of the same one of the first and second axle bearings so as to cause the axle to move in a nonlinear path.

20. The landing gear assembly according to claim 3, wherein the mounting aperture of the inner part of the second axle bearing is of substantially circular cross section and coaxial with the longitudinal axis of the axle.

* * * * *